Figure 1:
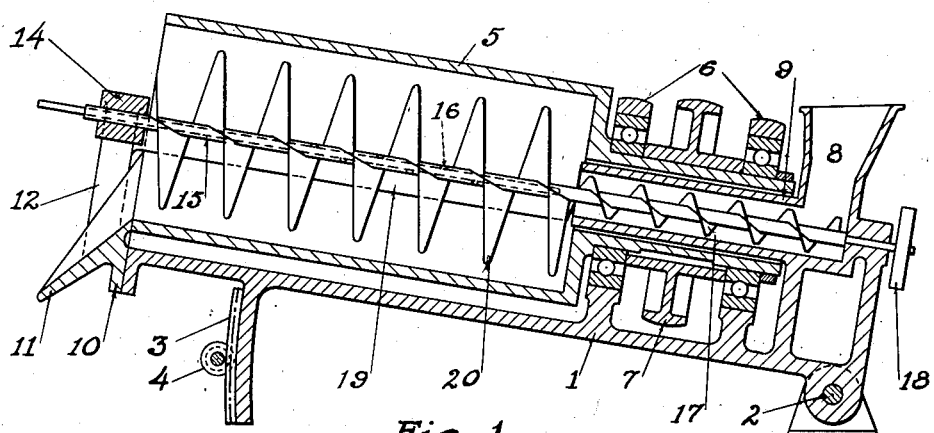

Feb. 19, 1935. H. ROSER 1,991,959
CONTINUOUS MIXER FOR DOUGH AND THE LIKE SUBSTANCES

Original Filed Oct. 30, 1931

Heinrich Roser
Inventor

By George B. Willcox
Attorney

Patented Feb. 19, 1935

1,991,959

UNITED STATES PATENT OFFICE 1,991,959

CONTINUOUS MIXER FOR DOUGH AND THE LIKE SUBSTANCES

Heinrich Roser, Stuttgart-Cannstatt, Germany, assignor to Baker Perkins Company, Inc., Saginaw, Mich., a corporation of New York Original application October 30, 1931, Serial No. 572,176. Divided and this application October 21, 1933, Serial No. 694,623. In Germany November 1, 1930

1 Claim. (Cl. 259—3)

This invention relates to mixers of the rotary drum type for the continuous mixing of heavy or plastic substances, such as bread dough, viscose, synthetic resins, and the like.

It has for its object the provision of an improved mixer especially adapted for the mixing and treatment of solid or semi-solid substances with liquid ingredients, which after mixing assume plastic consistency. For example, the invention is adapted for the treatment of caustic-treated cellulose with carbon disulfide in the production of rayon. The provision of co-acting serrations and teeth on the mixing drum surface and blade, or blades, respectively adapts the invention to use in shredding paper or other cellulose pulp. It can also be used for the mixing and kneading of bread dough.

In mixing materials of this type it is important that the ingredients be retained in the machine until they are thoroughly incorporated and take on a semi-solid or plastic consistency. They then are kneaded and worked at an even rate of speed toward the discharge end of the mixing drum so that the product discharged will be mixed and kneaded to a uniform extent at all times.

The improved means by which I accomplish this result comprises broadly a mixing drum mounted for rotation about its longitudinal axis which is positioned approximately horizontal. The lower surface or wall of the drum is inclined upwardly toward its discharge end. Several modes of construction may be employed to effect this. The mixing drum may be cylindrical shaped and its axis inclined upwardly toward the discharge end of the drum, or the axis may be horizontal and the drum reduced in diameter toward its outlet, or both features of construction may be employed. Driving means of suitable type is provided to rotate the drum.

According to my present invention the mixing and kneading actions are accomplished by the tumbling effect of the drum and the co-operant stirring and gradual propelling action of an independently rotatable transport spiral within the drum, together with the action of an appropriately shaped stationary kneading arm that is positioned close to the upwardly moving wall of the drum.

By the co-operation of the revolvable drum and the independently rotatable spiral the material is subjected to strong kneading and mixing action and is moved slowly and steadily along the kneading arm to the discharge end of the drum where it is discharged completely mixed and kneaded. The rate of forward movement while the material is being mixed and kneaded can be regulated over a wide range by changing the angle of inclination of the drum and by varying the relative rotating speeds of the drum and the transport spiral.

Referring to the drawing, Fig. 1 is a central longitudinal sectional view of a machine embodying my invention.

Figure 2:
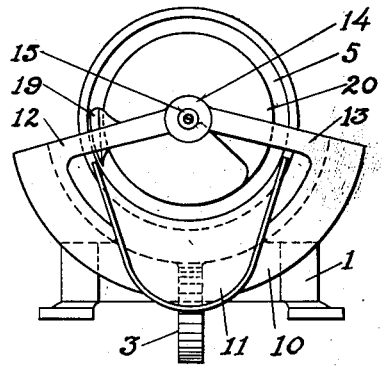

Fig. 2 is an end elevation of the machine shown in Fig. 1.

In my pending application for patent bearing Serial No. 572,176, of which this is a divisional application, I have described mixing machines of the type in question which are well adapted to serve the purposes for which they were designed and which in some respects are similar to the mixer hereinafter described. My present invention relates to certain novel arrangements and details of construction comprising the mixing, plasticizing and discharging mechanisms which are designed to speed up the operations described in my earlier application and which will afford a maximum of strength and stability, and a relatively small amount of power required for its operation.

To this end I have devised and invented the mixer which is illustrated in the accompanying drawing and hereinafter described in detail, my invention residing in the construction and arrangement of the mixing elements and the manner in which they co-operate to produce the desired results.

The machine comprises a frame 1 supported at one end on a trunnion 2 and inclined slightly from the horizontal, as shown. At its other end it is supported by a gear segment 3 meshing with the pinion 4, which is rotatable to raise or lower the end of frame 1 and adjust its inclination from the horizontal.

The cylindrical mixing drum 5 is mounted for rotation in bearings 6, supported by frame 1. A drive pulley 7 is fixed to drum 5 for connection to a suitable source of power, not shown.

At the lower end of frame 1 there is provided a feed-in funnel 8 integral with the frame and communicating with a feed tube 9 which leads to the interior of the drum. At the open end of the drum a flange 10 is fixed to the frame and carries a discharge chute 11 positioned to receive material coming from the drum. Radial arms 12, 13 fixed to the flange 10 carry a bearing 14 positioned at the axis of the drum. An axial shaft 15 is journaled in bearing 14 and extends through the drum to a journal in the other end of the frame. Shaft 15 is preferably made hollow and is provided with perforations 16. When liquid is to be added during the mixing process, the outer end of the shaft is coupled to the supply of liquid (not shown). A feed screw 17 is fixed to shaft 15 within the feed tube 9 to carry semi-solid or dry ingredients from the funnel 8 through the tube to the mixer. Shaft 15 is driven through a pulley 18.

A stationary kneader blade 19 is positioned within the drum and is fixed at the outlet end of the drum to arms 12, 13 and at the inlet end it is fixed to the end of feed tube 9. Blade 19 is supported, as shown, on fixed members, one of them being the end of tube 9, projecting into the drum through its head, the other being supported by one of the arms 12. The blade is preferably shaped so as to follow the contour of the lower part of the wall of the drum in the direction of rotation of the latter.

In the operation of this machine the solid ingredients are fed through funnel 8 to feed screw 17 which propels them continuously into the mixing drum. Liquid is supplied through hollow shaft 15. These loose ingredients, as for example, flour and water, are mixed at the lower end of the drum by the tumbling action of the drum, the stirring action of the transport spiral 20 and the scraping, deflecting and kneading action of the kneader blade 19. Due to the upward inclination of the drum toward its outlet, the materials tend to remain at the supply end until they are incorporated with each other and assume a doughy plastic consistency. As soon as they have attained that condition the plastic mass is acted upon by the transport spiral 20 and is worked gradually up the incline presented by the bottom wall of the drum, toward the discharge end. While it is thus slowly and steadily conveyed to the discharge point by the differential rotation of the drum and the spiral it is subjected to kneading and stretching so as to develop its plasticity and give it a uniform consistency. As the plasticity increases, the material tends more and more to be carried upwardly along the wall of the drum to the scraping and kneading blade 19 where it is scraped or sheared off, folded over, and projected inwardly toward the axis of the drum, falling down to the bottom where it is again and again subjected to the conjoint action of the rotating drum and the relatively rotating transport spiral 20.

If the lower wall of the mixing drum were horizontal or inclined downwardly to the outlet of the drum the loose unmixed ingredients, for example, flour and water, would tend to flow rapidly toward the outlet as soon as they entered the drum, and some parts of the material would be discharged insufficiently mixed, while other parts would be stiff and lacking in moisture. Even if the product might be reasonably well mixed and homogeneous, a good share of its travel through the drum would be wasted, and the kneading action would be too brief to "develop" some plastic substances, for example, bread dough.

By my improved construction the ingredients are retained in the drum until they are thoroughly incorporated, and they tend to flow back to the inner end of the drum until they have assumed a plastic consistency such that they can be acted upon by the blade 19.

The dough mass is steadily advanced through the drum by the action of the transport spiral 20 on shaft 15 which is driven clockwise as viewed in Fig. 2. The feed screw 20 is given a pitch and speed of rotation such as will propel the particular material being operated upon through the drum at the desired rate, depending upon the amount of mixing to which this material is to be subjected. Its working edge is spaced from the drum wall so that it does not have any important tendency to feed the more plastic materials upwardly along the drum toward the discharge end. But when the material becomes plastic and tends to "stand up" in a dough-like mass, then the spiral member 20 begins to propel it gradually toward the chute 11.

In the appended claims I have pointed out the essential elements of my invention, it being understood, however, that the claims are not intended to be limited to the form of the parts illustrated and described further than a limitation to the described form is necessary to distinguish them from the prior art.

Having thus described my invention, what I claim and desire to secure by Letters Patent is:

A mixing machine comprising in combination a drum mounted for rotation about its axis of symmetry with said axis in a recumbent position, said drum being open at one end for discharge of mixed material and having the bottom of its inside wall inclined upwardly toward said discharge end, power-actuated means for driving said drum, a power-driven transport spiral or feed screw mounted co-axially within and spaced from the inner wall of the drum, to engage and propel material after it has become partially mixed and somewhat plasticized, toward the discharge end of the drum, and a stationary blade extending along the inside wall of the drum in proximity thereto.

HEINRICH ROSER.